United States Patent Office

3,356,526
Patented Dec. 5, 1967

3,356,526
METHOD OF PREPARING WATER-DISPERSIBLE SOFTENER COMPOSITIONS AND PRODUCTS PRODUCED THEREBY
Milton M. Waldman, Northbrook, and Andrea E. Mariahazy, Westchester, Ill., assignors to Armour and Company, Chicago, Ill., a corporation of Delaware
No Drawing. Filed May 13, 1964, Ser. No. 367,193
2 Claims. (Cl. 117—100)

This invention relates to a method of preparing water-dispersible softener compositions. More particularly, it relates to a method of preparing a quaternary softener in the form of a dry, free-flowing powder which is readily dispersible in water. The invention also relates to products produced by the method.

Quaternary softeners are characterized by containing two long chain hydrocarbon groups, such as the hydrocarbon chains derived from tallow, or other natural fats and oils. One such quaternary softener which is widely used at the present time is di-tallow dimethyl ammonium chloride. Such compounds have a disadvantage in that they are not dry, free-flowing powders. A primary object of this invention, therefore, is to provide a method for preparing quaternary softeners in the form of dry, free-flowing powders which are readily dispersible in water. A related object is to prepare new softener compositions. Further objects and advantages will be indicated in the following detailed specification.

The present invention can be practiced with any of a broad class of quaternary softeners which contain two aliphatic hydrocarbon chains of from 8 to 22 carbons, and which have a melting point of at least 90° F., and preferably having a melting point of 100° F. These quaternaries, because they are in the ammonium salt form, are sufficiently water-soluble to permit their application to textile fabrics in water solutions, but they have limited water-dispersibility in solid form unless the dispersion is accomplished by vigorous mixing and the heating of the water.

Softeners usable in practicing the present invention may be represented by the following formula:

$$p\left[\begin{array}{c} R_1 \\ | \\ CH_3-N-R_3 \\ | \\ R_2 \end{array}\right]^+ [A]^{y(-)}$$

wherein $R_1$ and $R_2$ are straight chain hydrocarbon groups containing from 8 to 22 carbons, $R_3$ is methyl or $(CH_2CH_2O)_nH$ where $n$ is an integer from 5 to 60, A is a mono- or divalent anion, and $p$ and $y$ are integers selected from 1 or 2 to balance the valence. Preferably, $R_1$ and $R_2$ contain from 8 to 22 carbon atoms, such as palmityl, oleyl and stearyl. The ethoxy chain preferably contains from 15 to 50 ethoxy groups. The anion is preferably a monovalent anion, such as chloride, but other mono- or divalent anions can be used, such as acetate, sulfate, nitrate, phosphate, etc.

One preferred subclass of softeners is represented by the following formula:

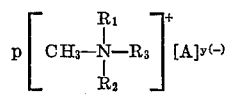

wherein $R_1$ and $R_2$ are straight chain hydrocarbon groups containing from 8 to 22 carbons and X is a monovalent anion.

The preferred ethoxylated quaternaries for use in the present invention are represented by the formula:

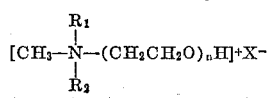

wherein $R_1$ and $R_2$ are straight chain hydrocarbons containing from 8 to 22 carbons and $n$ is an integer from 15 to 50. These ethoxylated quaternaries may be employed in combination with the quaternaries represented by the formula set out above. For example, from .1 to .35 part of the ethoxylated quaternary can be employed per part of the non-ethoxylated quaternary. In other formulations, up to 2 parts of the ethoxylated quaternary per part by weight of the non-ethoxylated quaternary can be used.

The first step in the method of this invention is the preparation of a solution of the quaternary softener in a volatile organic solvent for the softener. The lower alcohols, such as methanol, ethanol, or isopropanol, are suitable, and isopropanol is particularly desirable. Low-boiling hydrocarbon solvents can also be used, such as petroleum ether. Alternatively, chlorinated hydrocarbons may be used, including perchloroethylene and 1,1-trichloroethane. It will be understood that the specific solvent in itself is not critical for the method of this invention.

In accordance with the present invention, the solvent solution of the quaternary softener is applied to a water-soluble particulate carrier. Particularly desirable carriers are urea and sodium phosphate builders, such as sodium tripolyphosphate and tetrasodium pyrophosphate. Other particulate carriers can be employed, although somewhat less advantageously, are sodium carbonate and sodium sulfate. It is important that the carrier be sized within a rather narrow range. More specifically, at least 85% by weight of the carrier should range from —20 to +100 mesh as determined by U.S. Standard Screens. Optimum results are achieved when at least 85% of the carrier corresponds with these size range specifications.

In accordance with the present invention, controlled quantities of the organic solvent solution of the quaternary softener are sprayed on the particulate carrier while the carrier is being agitated. Preferably, the carrier is continuously agitated while the spray is being applied. Suitable agitation can be obtained with a blender or a tumbler mixer. The rate of application of the spray is preferably controlled so that there is no agglomeration or caking of the particulate carrier as the particles of the carrier are being coated with the softener solution. The agitation and mixing is continued until all of the solution has been applied and the solvent has substantially evaporated, leaving the individual particles of the carrier coated with the softener.

The evaporation of the solvent may be promoted by carrying out the spraying and mixing under a reduced pressure. For example, the pressure may be reduced to 28-29 in. Hg vacuum. Usually, it will not be desirable to apply heat, and the application of the solvent can therefore be advantageously carried out at ordinary room temperature. There is no desire to obtain a chemical reaction between the softener and the carrier, and in fact this is believed to be disadvantageous. The procedure described is therefore designed to form a surface coating of the softener on the carrier, which functions as an inert support for the softener and as a means for promoting the water-dispersion of the softener. Since the particles of carrier are substantially completely coated with the softener, even relatively hygroscopic materials such as urea can be employed, while the final composition will remain in free-flowing condition even in the presence of a moist atmosphere.

As indicated, the present process is carried out without caking or agglomeration of the particulate material. Preferably, the carrier remains in substantially the same state of subdivision in the final product. For example, the coated carrier will be sized so that at least 80% by weight ranges from —20 to +100 mesh as determined by U.S. Standard Screens. Preferably, where the initial carrier material has 90% or more by weight within this size range, the final coated product will similarly have 90% or more within this size range.

If desired, other ingredients can also be incorporated in the water-dispersible softener composition. For example, dyes, perfumes, etc., can be dissolved in the organic solvent solution, and applied to the carrier at the same time as the softener.

The product resulting from the process described above can be used as a textile softener in the powdered form. The product is also well adapted to the preparation of an effervescent textile softener tablet. Such tablets can be formulated with the softener in admixture with a suitable effervescent composition composed of at least one water-soluble carbonate salt, releasing carbon dioxide in acidic aqueous solution and at least one water-soluble acidic carbon dioxide releasing agent. Preferably, the carbonate salt is sodium bicarbonate, sodium carbonate, sodium sesquicarbonate, or mixtures of two or more of these carbonate salts. The carbon dioxide-releasing agent can be an inorganic acid salt such as sodium dioxygen phosphate, sodium acid pyrophosphate, or an organic acid such as citric acid, tartaric acid, or fumaric acid. For example, sodium bicarbonate can be employed in admixture with citric acid. The softener composition may comprise from 75–85% of the formulation, while the effervescent composition may comprise from 15–25% by weight. Usually, the carbonate and acidic agent will be employed in approximately equal stoichiometric proportions. For example, 4 parts of sodium bicarbonate may be employed per 3 parts of citric acid.

In forming the tablets, all of the ingredients will be thoroughly mixed, and the powder will be formed into tablets in a suitable tablet press. No additional tabletting or binding agent is normally required.

This invention is further illustrated by the following specific examples:

Example 1

A dimethyl di(hydrogenated) tallow quaternary ammonium chloride (75% in isopropanol) is mixed with a quaternized alkylene oxide adduct of dicocoamine containing 15 moles of ethylene oxide per mole of dicocoamine (75% in isopropanol). The proportions selected may range advantageously from 75–90% of the tallow quaternary and from 10–25% of the ethoxylated dicocoamine quaternary. 4 parts of the mixture are then mixed with one part of water and 3 parts of isopropanol. The water can be omitted, but it is preferable to include it where it is also desired to introduce other ingredients at this stage, such as brighteners, perfumes, dyes, etc. Powdered urea, at least 90% of which ranges in size from −20 to +100 mesh, is placed in a mixer, and the solution of the quaternaries and other ingredients is sprayed onto the tumbling urea powder at such a rate as to prevent the urea mix from becoming wet enough to cake or agglomerate. The material is then dried either in the air or in a low temperature oven. Alternatively, the mixing can be carried out under a reduced pressure to promote the removal of the solvent. The resulting product is a combination of from 4–30% by weight of the quaternary active on the urea particles, that is, the product contains from 4 to 30 parts by weight of the softener per 100 parts of urea, and the product is a free-flowing, non-caking, textile softener powder which is readily dispersible in either cold or hot water.

Example 2

The process is carried out as described in Example 1, except that the dimethyl di(hydrogenated) tallow quaternary ammonium chloride (75% in isopropanol) is mixed with a quaternized alkylene oxide adduct of di(hydrogenated) tallow containing 7.5 moles of ethylene oxide per mole of di(hydrogenated) tallow amine (75% in isopropanol), the proportion selected being 23–30% of the tallow quaternary and from 70–75% of the ethoxylated di-hydrogenated) tallow quaternary.

Example 3

The process is carried out as described in Example 1, except that instead of using powered urea prilled urea particles (Micro-Prill) are used.

Example 4

The quaternaries employed are those set out in Example 2. The process is carried out as described in Example 1, but instead of powdered urea, prilled urea particles (Micro-Prill) are used.

Example 5

The process is carried out as described in Example 1, except that sucrose is substituted for powdered urea, the proportions and method of preparation being as described in Example 1.

Example 6

The quaternaries employed are those set out in Example 2. The method of preparation and proportions are those set out in Example 1, except that sucrose is substituted for powdered urea.

Example 7

The process is carried out as described in Example 1, using the same method of preparation and proportions but substituting borax for powdered urea.

Example 8

Using the quaternaries described in Example 2, the process is carried out as to method of preparation and proportions as described in Example 1, substituting borax for powdered urea.

Example 9

The process is carried out as described in Example 1, except that sodium sulfate is employed instead of powdered urea as substrate.

Example 10

Using the quaternaries described in Example 2 but employing sodium sulfate instead of powdered urea, the process is carried out as described in Example 1.

Example 11

The process is carried out as described in Example 1, except that sodium carbonate is employed instead of powdered urea as substrate.

Example 12

The process is carried out as described in Example 1, except that the quaternaries employed are those described in Example 2.

Example 13

The process is carried out as described in Example 1, except that sodium tripolyphosphate is employed instead of powered urea as substrate.

Example 14

Using the quaternaries described in Example 2 and substituting sodium tripolyphosphate for powdered urea, the process is carried out in the manner described in Example 1.

Instead of employing the specific organic powders described in the above Examples 1–6 inclusive and the inorganic salts described in Examples 7–14 inclusive, it will be understood that any of the powders and salts may be combined to give any desired density and to serve as the substrate in the process described in Example 1, and with such combinations the quaternaries described in Examples 1 and 2 may be employed.

While in the foregoing specification this invention has been described in relation to specific embodiments thereof, and many details have been set forth for purpose of

We claim:
1. The method of preparing a quaternary softener in the form of a dry, free-flowing powder which is readily dispersible in water, comprising:
(a) preparing a solution of a quaternary softener in a volatile organic solvent for the softener, said quatenary softener having a melting point of at least about 90° F. and being represented by the formula:

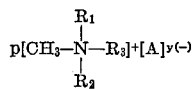

wherein $R_1$ and $R_2$ are straight chain hydrocarbon groups containing from 8 to 22 carbons, $R_3$ is methyl or $(CH_2CH_2O)_nH$ where $n$ is an integer from 5 to 60, A is a mono- or divalent anion, and $p$ and $y$ are integers selected from 1 or 2 to balance the valence;
(b) spraying controlled quantities of said solution onto solid particles of urea while said urea is being agitated and forming a surface coating around the individual particles of said urea, said urea being sized so that at least about 90° by weight thereof ranges from −20 to +100 mesh as determined by U.S. Standard Screens; and
(c) continuing said agitation and spraying until all of said solution has been applied and said solvent has evaporated, leaving the individual particles of said urea coated with said softener without appreciable chemical reaction between said urea and said softener coating, said coated urea still being sized so that at least 90% by weight thereof ranges from −20 to +100 mesh, and said coated urea containing from 4 to 30 parts by weight of said softener per 100 parts of urea.
2. The dry, free-flowing, water-dispersible product produced by the method of claim 1.

References Cited

UNITED STATES PATENTS

| | | | |
|---|---|---|---|
| 3,044,962 | 7/1962 | Brunt et al. | 252—8.8 |
| 3,256,180 | 6/1966 | Weiss | 252—8.8 |

LEON D. ROSDOL, *Primary Examiner.*

J. T. FEDIGAN, *Assistant Examiner.*